US008182785B2

(12) United States Patent
Dussault et al.

(10) Patent No.: US 8,182,785 B2
(45) Date of Patent: May 22, 2012

(54) METHODS AND COMPOSITIONS FOR GENERATING SINGLET OXYGEN

(75) Inventors: Patrick H. Dussault, Lincoln, NE (US); Prasanta Ghorai, Paschim Mednipur (IN)

(73) Assignee: Nutech Ventures, Lincoln, NE (US)

( * ) Notice: Subject to any disclaimer, the term of this patent is extended or adjusted under 35 U.S.C. 154(b) by 77 days.

(21) Appl. No.: 12/482,199

(22) Filed: Jun. 10, 2009

(65) Prior Publication Data

US 2010/0040530 A1 Feb. 18, 2010

Related U.S. Application Data

(60) Provisional application No. 61/131,799, filed on Jun. 11, 2008.

(51) Int. Cl.
*C01B 13/10* (2006.01)
(52) U.S. Cl. .............................. 423/581; 423/579; 8/111
(58) Field of Classification Search .................. 423/581, 423/579; 8/111; 510/303, 309, 310
See application file for complete search history.

(56) References Cited

U.S. PATENT DOCUMENTS

| | | | | |
|---|---|---|---|---|
| 4,013,581 | A * | 3/1977 | Huber | 252/186.26 |
| 6,440,915 | B2 * | 8/2002 | Rader et al. | 510/191 |
| 6,623,718 | B1 | 9/2003 | Christe et al. | |
| 6,992,053 | B2 * | 1/2006 | Cermenati et al. | 510/238 |
| 7,513,132 | B2 * | 4/2009 | Wright et al. | 68/18 F |
| 2004/0067863 | A1 * | 4/2004 | Speckmann et al. | 510/312 |

FOREIGN PATENT DOCUMENTS

| | | |
|---|---|---|
| CN | 101041424 | 9/2007 |
| WO | WO 03/70699 | 8/2003 |

OTHER PUBLICATIONS

Adam et al, "Singlet—Oxygen Chemiluminescence in Peroxide Reactions," *Chemical Reviews*, 2005,105(9):3371-3387.
Alsters et al., "Dark Singlet Oxygeneation of β-Citronellol: A Key Step in the Manufacture of Rose Oxide," *Org. Proc. Res & Dev.*, 2010, 14:259-262.
Aubry, "Search for singlet oxygen in the decomposition of hydrogen peroxide by mineral compounds in aqueous solutions," *Journal of the American Chemical Society*, 1985, 107(21):5844-5849.
Aubry et al., "Reversible Binding of Oxygen to Aromatic Compounds," *Acc. Chem. Res.*, 2003, 36: 668-675.
Aubry et al., "Dark singlet oxygenation of organic substrates in single-phase and multiphase microemulsion systems," *Tetrahedron*, 2006, 62(46):10753-10761.
Bartlett et al., "Controlled generation of singlet oxygen at low temperatures from triphenyl phosphite ozonide," *Journal of Organic Chemistry*, 1980, 45(22):4269-4271.
Bartlett and Kice, "A Kinetic Study of the Rearrangement of Some Benzoates of 9-Decalyl Hydroperoxide," *J. Am. Chem. Soc.*, 1953, 75(22):5591-5595.

Carreno et al., *Angewandte Chemie, International Edition*, 2006, 45(17):2737-2741.
Catir et al., "Singlet Oxygen Generation from [Bis(trifluoroacetoxy)iodo]benzene and Hydrogen Peroxide," *J. of Org. Chem*, 2009, 74:4560-4564.
Clennan and Pace, "Advances in singlet oxygen chemistry," *Tetrahedron*, 2005, 61(28):6665-6691.
Caron et al., "Convenient singlet oxygenation in multiphase microemulsion systems," *Journal of Molecular Catalysis A: Chemical*, 2006, 251(1-2):194-199.
Cerkovnik et al., "The Ozonation of Silanes and Germanes: an Experimental and Theoretical Investigation," *J. Am. Chem. Soc.*, 2006, 128(1):4090-4100.
Cló et al., "Control and Selectivity of Photosensitized Singlet Oxygen Production: Challenges in Complex Biological System," *ChemBioChem.*, 2007, 81:1497-1501.
Dussault, "Reactions of Hydroperoxides and Peroxides," *Active Oxygen in Chemistry*, 1995, Ch.5, pp. 141-203.
Endo, "Chemical oxygen-iodine laser: Recent advances as a chemical device," *Russ. J. Phys. Chem. A*, 2007, 81(9):1497-1501.
Ferrer et al., "The Release of Singlet Oxygen in the Reaction of Dioxiranes with Amine N-Oxides," *Eur J. Org. Chem.*, 1998, 2527-2532.
Foote and Clennan, "Properties and reactions of singlet oxygen," In *Active Oxygen in Chemistry*, 1995, Black Academic and Professional, London, pp. 105-141.
Foote and Clennan, "Structure Energetics and Reactivity Chemistry Series," In *Active Oxygen in Chemistry*, pp. 105-140.
Foote et al., "Chemistry of singlet oxygen. IV. Oxygenations with hypochlorite-hydrogen peroxide," *J. Am. Chem. Soc.*, 1968, 90(4):975-981.
Ghorai and Dussault, "A new peroxide fragmentation: efficient chemical generation of 1O2 in organic media," *Organic Letters*, 2009, 11 (20):4572-4575.
Goodman et al., "Experimental Support for the Primary Stereoelectronic Effect Governing Baeyer—Villiger Oxidation and Criegee Rearrangement," *J. Am. Chem. Soc.*, 1998, 120(32), 9392-9393.
Greer, "Christopher Foote's Discovery of the Role of Singlet Oxygen [$^1O_2$ ($^1\Delta_g$)] in Photosensitized Oxidation Reactions," *Acc. Chem. Res.*, 2006, 39:797-804.
Jefford et al., "A New Method for the Synthesis of gem-Dihydroperoxides," *Synth. Commun.*, 1990 20:2589.
Kim et al., "Synthesis and antimalarial activity of novel medium-sized 1,2,4,5-tetraoxacycloalkanes," *J. Med. Chem.*, 2001, 44(1):2357-2361. Kodymova, "COIL—Chemical Oxygen Iodine Laser: advances in development and applications," *Proc. SPIE*, 2005, 5958:595818/1-595818/11.
Kopecky et al., "Preparation and Thermolysis of some 1,%Dioxetanes," *Can. J. Chem.*, 1975, 53(8):1103-1122.
Kanofsky, "Singlet oxygen production by chloroperoxidase-hydrogen peroxide-halide systems," *Journal of Biological Chemistry*, 1984, 259(9):5596-5600.
Kodymova et al., Research on chemical and discharge oxygen-iodine lasers, *Optics and Spectroscopy*, 2009, 107(5):816-825.

(Continued)

*Primary Examiner* — Melvin C Mayes
*Assistant Examiner* — Melissa Stalder
(74) *Attorney, Agent, or Firm* — Fish & Richardson P.C.

(57) ABSTRACT

Methods for producing singlet oxygen from 1,1-dihydroperoxides are provided herein. In some embodiments, the methods involve base-mediated decomposition of monoactivated derivatives of 1,1-dihydroperoxides. In some embodiments, the methods involve additive-mediated decomposition of 1,1-dihydroperoxides.

18 Claims, No Drawings

OTHER PUBLICATIONS

Li et al., "A Broadly Applicable Mild Method for the Synthesis of *gem*-Diperoxides from Corresponding Ketones or 1,3-Dioxolanes," *Organic Letters*, 2009, 11(7):1615-1618.

Mendenhall, *Advances in Oxygenated Processes*, 1990, Baumstock, ed., 2:203.

Nowakowska, "Solvent effect on the quantum yield of the self-sensitized photoperoxidation of 1,3-diphenylisobenzofuran," *J. Chem. Soc., Faraday Trans. 1: Physical Chemistry in Condensed Phases*, 1984, 80:2119-2126.

Pellieux et al., "Bactericidal and virucidal activities of singlet oxygen generated by thermolysis of naphthalene endoperoxides," *Meth. Enzymol.*, 2000, 319:197-207.

Pierlot et al., "Optimisation of the chemical generation of singlet oxygen (1O2, 1deltag) from the hydrogen peroxide-lanthanum(III) catalytic system using an improved NIR spectrometer," *Photochemical & Photobiological Sciences*, 2009, 8(7):1024-1031.

Pierlot et al., "Calcium peroxide diperoxohydrate as a storable chemical generator of singlet oxygen for organic synthesis," *J. Org. Chem.*, 2002, 67(8):2418-2423.

Posner et al., "A new Oxidizing Reagent: Triethylsilyl Hydrotrioxide," *J. Org. Chem.*, 1989, 54(14):3252-3254.

Renirie et al., "Vanadium chloroperoxidase as a catalyst for hydrogen peroxide disproportionation to singlet oxygen in mildly acidic aqueous environment," *Adv. Synth. Catal.*, 2003, 345:849-858.

Safety and Handling of Organic Peroxides (AS-109) *The society of the Plastics Industry, Inc.*, Aug. 1999 http://www/plasticsindusstry.org/aboutorganicperoxide.html.

Schmidt, "Photosensitized generation of singlet oxygen," *R. Photochem. Photobiol.*, 2006, 82:1161-1177.

Schwartz ete al., "Fragmentation of Carbonyl Oxides by N-Oxides: An Improved Approach to Alkene Ozonolysis," *Organic Letters*, 2006, 8(15):3199-3201.

Schwartz et al., "'Reductive ozonolysis' via a new fragmentation of carbonyl oxides," *Tetrahedron*, 2006, 62(46):10747-10752.

Shanley, *Organic Peroxides*, 1970, Swern, Ed., Wiley-Interscience, New York, vol. 3, pp. 341.

Solaja et al., "Mixed steroidal 1, 2,4,5-tetraoxanes: Antimalarial and antibacterial activity," *J. Med. Chem.*, 2002, 45:3331-3336.

Thompson, "Ozone Oxidation of Nucleophilic Substances. I. Tertiary Phosphite Esters," *J. Am. Chem. Soc.*, 1961, 83:845-851.

Velluz et al., "Bishydroperoxydes stéroïdes. II Préparation et propriété (Bishydroperoxide steroids. II. Preparation and properties)," *Bull. Soc. Chico. Fr.*, 1957, 879.

Wahlen et al., "Molybdate-exchanged layered double hydroxides for the catalytic disproportionation of hydrogen peroxide into singlet oxygen: Evaluation and improvements of 1O2 generation by combined chemiluminescence and trapping experiments," *Applied Catalysis, A: General*, 2005, 293:120-128.

Wahlen et al., "Solid Materials as Sources for Synthetically Useful Singlet Oxygen ," *Synth. Cat.*, 2004, 346(2-3):152-164.

Wilkinson et al., "Rate Constants for the Decay and Reactions of the Lowest Electronically Excited Singlet State of Molecular Oxygen in Solution. An Expanded and Revised Compilation," *Journal of Physical and Chemical Reference Data*, 24(2):663-1021.

Zmitek et al., "Alpha-substituted organic peroxides: synthetic strategies for a biologically important class of gem-dihydroperoxide and perketal derivatives.," *Org. Biomol. Chem.*, 2007, 5(24):3895-3908.

Zmitek et al., "Iodide as a Catalyst for Efficient Conversion of Ketones to gem-Dihydroperoxides by Aqueous Hydorgen Peroxide," *Organic Letters*, 2006, 8 (12):2491-2494.

* cited by examiner

METHODS AND COMPOSITIONS FOR GENERATING SINGLET OXYGEN

CROSS REFERENCE TO RELATED APPLICATIONS

This application claims priority under 35 U.S.C. §119(e) of U.S. provisional application Ser. No. 61/131,799, filed Jun. 11, 2008.

FEDERALLY SPONSORED RESEARCH OR DEVELOPMENT

This invention was made with government support under Grant No. CHE-0749916 awarded by the National Science Foundation. The government has certain rights in the invention.

TECHNICAL FIELD

This disclosure relates to methods for generating singlet oxygen. This disclosure also relates to methods for preparative chemical generation of singlet oxygen in organic media from 1,1-dihydroperoxides and their monoactivated derivatives.

BACKGROUND

Singlet molecular oxygen (typically referred to as $^1O_2$, specifically the $a^1\Delta_g$ state of $O_2$) can be an oxidant in chemistry, biology, and medicine; it can also be the energy source for chemical oxygen/iodine lasers. Methods for preparation of singlet oxygen include photosensitized excitation of ground state oxygen, and chemical generation of $^1O_2$ by the reaction of bleach and hydrogen peroxide. Other methods include decomposition of unstable metal peroxides, organic endoperoxides, phosphite ozonides, or silyl hydrotrioxides, and decomposition of aqueous hydrogen peroxide by chlorine, as well as molybdate and other transition metal ions.

SUMMARY

This disclosure provides methods for chemical generation of singlet oxygen in organic media from 1,1-dihydroperoxides and their monoactivated derivatives. In some embodiments, the methods provide preparatively useful amounts of singlet oxygen.

In some embodiments, the method involves base-mediated decomposition of a monoactivated dihydroperoxide. In some embodiments, the base can be: cesium hydroxide, cesium carbonate, potassium tert-butoxide, tetra-n-butyl ammonium fluoride, cesium fluoride, or tetraalkyl ammonium hydroxide. In some embodiments, the method involves a two-step process wherein a 1,1-dihydroperoxide is reacted to form a monoactivated derivative of 1,1-dihydroperoxide, and then the monoactivated derivative is decomposed in the presence of base to generate singlet oxygen. In some embodiments, the method involves a one-step process in which a 1,1-dihydroperoxide reacts with an activating reagent in excess base to form a transient monoactivated derivative of 1,1-dihydroperoxide, which decomposes generating singlet oxygen. In some embodiments, the monoactivated derivatives of 1,1-dihydrogen peroxide, which decompose in the presence of base are compounds of formula (1):

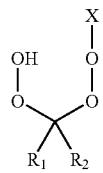

wherein: R1 and R2 are independently chosen from: methyl, primary alkyl, secondary alkyl, alkoxyalkyl, and oxoalkyl, or R1 and R2 together form an aryl, cycloalkyl, arylalkyl, or haloalkyl group; and X is chosen from: acyl, carboxyl, sulfonyl, sulfoxyl, phosphoryl, carbamyl, aryl, vinyl, and imidyl.

In some embodiments, the method involves decomposition of 1,1-dihydroperoxide in the presence of stoichiometric or catalytic additive. In some embodiments, the additive can be one or more of iodobenzene diacetate, Dess-Martin periodinane, pyridinium dichromate, tetra-n-propyl ammonium perruthenate, titanium tetraisopropoxide, titanium xos bis(acetylacetonate), vanadyl oxide triisopropoxide, vanadyl acetonylacetonate, molybdenum, bis(acetylacetonate), tungstent (VI) ethoxide, phenylboronic acid, propyl magnesium chloride, diethyl zinc, magnesium bromide, and magnesium tert-butoxide. In some embodiments, the additive can be one or more of iodine (III) reagents, iodine (IV) reagents, soluble chromium (IV) reagents, neutral and basic Ti (IV) reagents, neutral and basic vanadium (V) reagents, magnesium salts, organoboronic acids, organozinc reagents, organomagnesium reagents, neutral and basic molybdenum (VI) reagents, soluble magnesium (II) reagents, and soluble zinc (II) reagents. In some embodiments, the 1,1-dihydroperoxide can be a compound of formula (2):

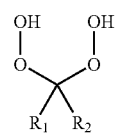

wherein R1 and R2 are independently chosen from methyl, primary alkyl, secondary alkyl, alkoxyalkyl, and oxoalkyl, or R1 and R2 together form an aryl, cycloalkyl, arylalkyl, or haloalkyl group, further wherein only one of R1 or R1 can be hydrogen; and X is chosen from: acyl, carboxyl, sulfonyl, sulfoxyl, phosphoryl, carbamyl, aryl, vinyl, and imidyl.

DESCRIPTION

Wherever the phrase "for example," "such as," and the like are used herein, the phrase "and without limitation" is understood to follow unless explicitly stated otherwise. As used herein, "about" is meant to account for variations due to experimental error. All measurements reported herein are understood to be modified by the term "about", whether or not the term is explicitly used, unless explicitly stated otherwise.

The present disclosure provides methods for the chemical generation of singlet oxygen from 1,1-dihydroperoxides and their activated derivatives.

1,1-dihydroperoxides can be produced from ketones and aldehydes from methods known in the art, for example according to Scheme 1 below:

Scheme 1: Production of 1,1-dihydroperoxides from ketones/aldehydes

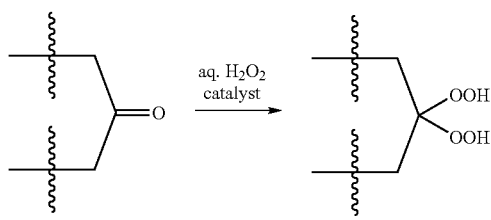

Exemplary methods of producing 1,1-dihydroperoxides according to Scheme 1 include: i) use of hydrogen peroxide in acetonitrile using catalytic iodine (Zmitek, Zupan, Stavber Iskra, *Organic Letters*, 2006, 8, 2491); ii) use of hydrogen peroxide in t-butanal with catalytic hydrogen chloride (Velluz, et al.: *Bull. Soc. Chim. Fr.*, 1957, 879); iii) use of 30% hydrogen peroxide with catalytic aqueous hydrogen chloride in a solution of dichloromethane and acetonitrile (Solaja, et al., *J. Med. Chem.*, 2002, 45, 3331); and iv) use of aqueous hydrogen peroxide with catalytic tungstic acid in acetonitrile (Jefford, et al.: *Synth. Commun.*, 1990, 20, 2589).

The activated derivative of 1,1-dihydroperoxide can be produced from the corresponding 1,1-dihydroperoxide using methods known in the art. For example, an activated monoperester derivative of the 1,1-dihydroperoxide can be formed by reacting the corresponding 1,1-dihydroperoxide with acetic anhydride in pyridine. As another example, an activated monopercarbonate 1,1-dihydroperoxide derivative can be formed by reacting the corresponding 1,1-dihydroperoxide with ethyl chloroformate in pyridine.

1. Base-Mediated Decomposition of Monoactivated 1,1 Dihydroperoxides

In some embodiments, singlet oxygen is produced via base-promoted decomposition of monoactivated 1,1-dihydroperoxides, for example as shown in Scheme 2 below.

In some embodiments, the presence of base generates preparatively useful amounts of singlet oxygen.

As is exemplified in Scheme 2, in some embodiments, the activated derivative of 1,1-dihydroperoxide is stable (isolable) and can be used as the initial reactant. In some embodiments wherein the monoactivated derivative is stable, the activating group is any group capable of activating the O—O bond towards heterolytic cleavage in the presence of base; for example the activating group can be acyl or carboxyl. In some embodiments, the stable, activated derivative of 1,1-dihydroperoxide is a monoperester, a monopercarbonate, or a monopercarbamate, wherein the activating group is capable of activating the O—O bond toward heterolytic cleavage.

Also as shown in Scheme 2, in some embodiments, the activated derivative of 1,1-dihydroperoxide is transient such that the formation and decomposition of the intermediate activated derivative occurs essentially simultaneously. In some embodiments, formation and decomposition of the intermediate both occur rapidly in the presence of the base present in the reaction. In some embodiments, wherein the monoactivated derivative is not stable, the activating group can be strongly electron withdrawing. In some embodiments, wherein the monoactivated derivative is not stable, the activating group can be sulfonyl, sulfate, or phosphoryl. In some embodiments, the transient intermediate activated derivative is a monopersulfonate. The activated monopersulfonate derivative of 1,1-dihydroperoxide can be formed by methods known in the art. For example, the monopersulfonate derivative can be formed and decomposed by reacting the corresponding 1,1-dihydroperoxide with toluenesulfonyl chloride in tetrahydrofuran.

Examples of derivatives of 1,1-dihydroperoxides useful for producing singlet oxygen, and examples of such derivatives which do not generate singlet oxygen in accordance with embodiments disclosed above are identified in Table 1 below.

Scheme 2: Overview of Base-promoted decomposition of monoactivated 1,1-dihydroperoxides

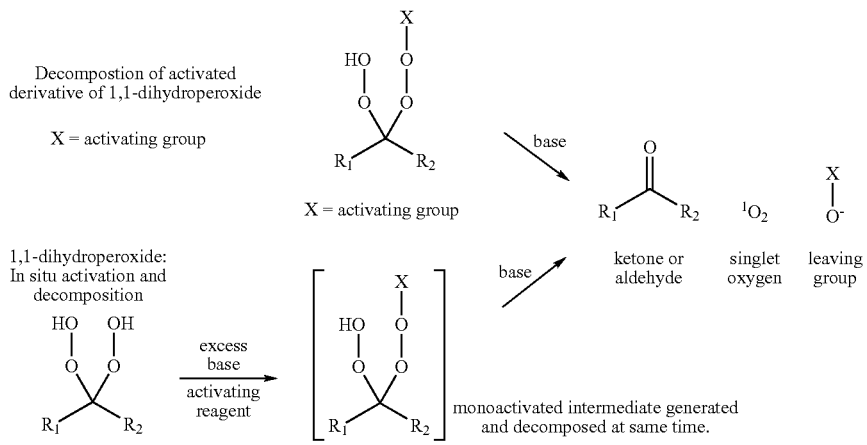

TABLE 1

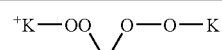

deprotonated mono (esters, carbonates, sulfonates, sulfates, nitrates, phosphates, aryl, hetroaryl) derivatives of 1,1-dihydroperoxide: rapidly decomposes to generate singlet oxygen monoperester of dihydroperoxide: does not decompose or generate singlet oxygen

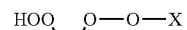

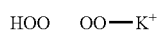

monoanion of dihydroperoxide: does not decompose or generate single oxygen

Monosulfonates (X = arenesulfonyl or alkylsulfonyl), monocarbonates (X = C(O)OEt and similar), decompose slowly but without generation of singlet oxygen.

Non-limiting exemplary methods for forming the monoactivated derivatives are illustrated in Scheme 3 below.

Scheme 3: Exemplary Methods for Forming Activated 1,1-dihydroperoxide derivatives

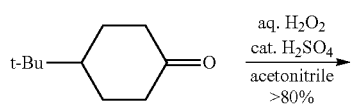

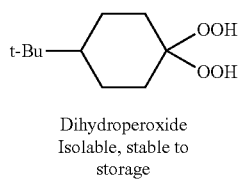

Dihydroperoxide
Isolable, stable to storage

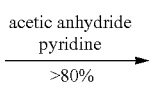 acetic anhydride pyridine >80%

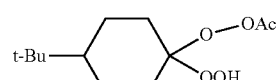

Reagent perester (isolable)
Stable at least days
(solid or solution)

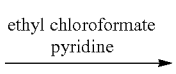 ethyl chloroformate pyridine

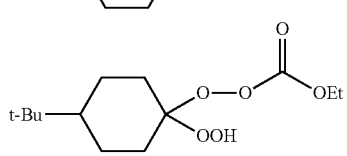

percarbonate (isolable)
Decomposes with half-life of hours to days

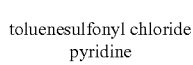 toluenesulfonyl chloride pyridine

persulfonate
not observed:

In some embodiments, methods of producing singlet oxygen involve base-promoted decomposition of mono-activated 1,1-dihydroperoxides of formula (1):

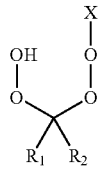
(1)

The base-promoted decomposition reaction can occur in an organic solvent.

Based upon observations, as well as the presumed mechanism of the reaction, The base-promoted decomposition to generate singlet oxygen (both stepwise formation and direct decomposition of 1,1-dihydroperoxide in the presence of excess base) is expected to be successful for a large combination of substituents at R1 and R2, as long as these groups are linked to the central carbon of the dihydroperoxide or activated derivative by carbon atoms. Non-limiting exemplary combinations of R1 and R2 include: methyl/methyl, alkyl/alkyl, methyl/alkyl, alkyl/aryl, cycloalkyl. In some embodiments, the R1 and R2 combinations can be: primary alkyl/primary alkyl; primary alkyl/secondary alkyl; cyclic arrays in which R1 and R2 are part of cycloalkyl, heteroatom-substituted cycloalkyl, or heterocyclic rings. In some embodiments, the alkyl and cycloalkyl fragments can include heteroatom substituents and heteroatom components of the skeleton subject to the constraint of having a carbon atom linkage to the 1,1-dihydroperoxide core. For example, in some embodiments, the primary or secondary alkyl group can be substituted for example with halogen, amine, ammonium, or oxygen substituents. The chemistry is also expected to be possible for very small dihydroperoxide (for example, R1 or R2 equal to methyl), but it should be noted that the intermediates are expected tp be explosive.

By contrast, the base-promoted decomposition with generation of singlet oxygen is not expected to be successful if R1 or R2 is H (hydrogen) due to the facility of competing Kornblum fragmentation, or if R1 or R2 is equal to an electron-rich arene, electron-rich alkene, or electron-rich heteroarene due to carbon-to-oxygen skeletal rearrangement (Criegee reaction).

Non-limiting examples of skeletons suitable for this reaction are illustrated in Scheme 4.

Scheme 4. Yields of $^1O_2$ for base-mediated decomposition of monoactivated derivative of dihydroperoxides varying in skeleton.

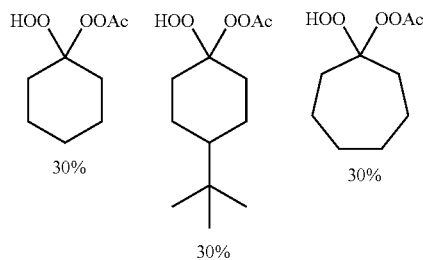

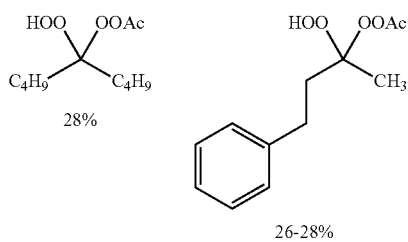

In some embodiments, therefore, the compounds of formula (1), which are decomposed in organic solvent producing singlet oxygen are as follows:

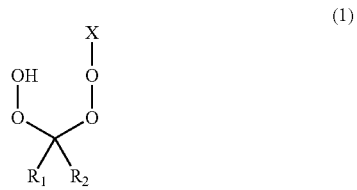
(1)

wherein: R1 and R2 are independently chosen from: methyl, primary alkyl, secondary alkyl, alkoxy, alkoxyalkyl, and oxoalkyl, or R1 and R2 together form an aryl, cycloalkyl, arylalkyl, or haloalkyl group; and X is chosen from: acyl, carboxyl, sulfonyl, sulfoxyl, phosphoryl, carbamyl, aryl, vinyl, and imidyl. In some embodiments, neither R1 nor R2 are hydrogen. In some embodiments, R1 is chosen from alkyl, cycloalkyl and aryl, and R2 is chosen from alkoxy.

In some embodiments, methods of forming singlet-oxygen via base-mediated decomposition of derivatives of 1,1 dihydroperoxides involves separately preparing derivatives of 1,1-dihydroperoxide (of sufficient stability) and then decomposing the derivatives in the presence of base. In some embodiments of the two-step process, the derivatives are exemplified by peresters (X is acyl) or percarbonates (X is carboxyl). In some embodiments, wherein the derivative of the 1,1 dihydroperoxide is less stable, methods of forming singlet oxygen via base-mediated decomposition of derivatives of 1,1 dihydroperoxides involves generating and decomposing the derivatives in situ, via the reaction of a corresponding 1,1 dihydroperoxide with excess base and an activating agent. In some embodiments of the one-step process, the derivative is a monopersulfonate. Scheme 5 below illustrates examples of embodiments of both the two-step and one-step process.

Scheme 5: specific examples of base-mediated decomposition of monoactivated dihydroperoxides.

1. Examples of $^1O_2$ generation via decomposition of isolated monoactivated dihydroperoxides

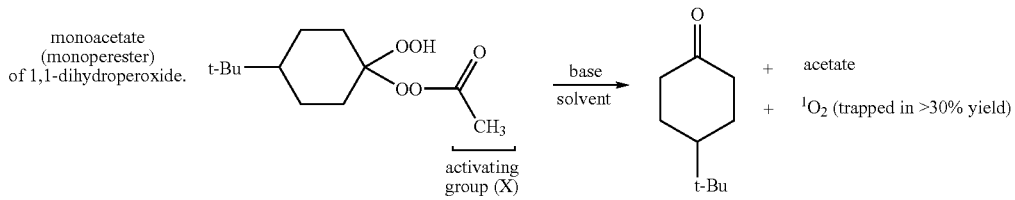

Similar results with other peresters and percarbonates:

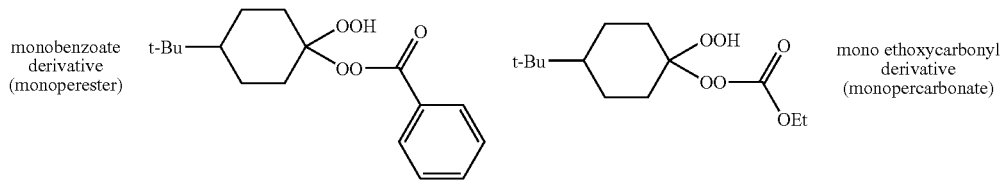

2. Examples of $^1O_2$ generation via in situ formation and decomposition of monoactivated dihydroperoxide

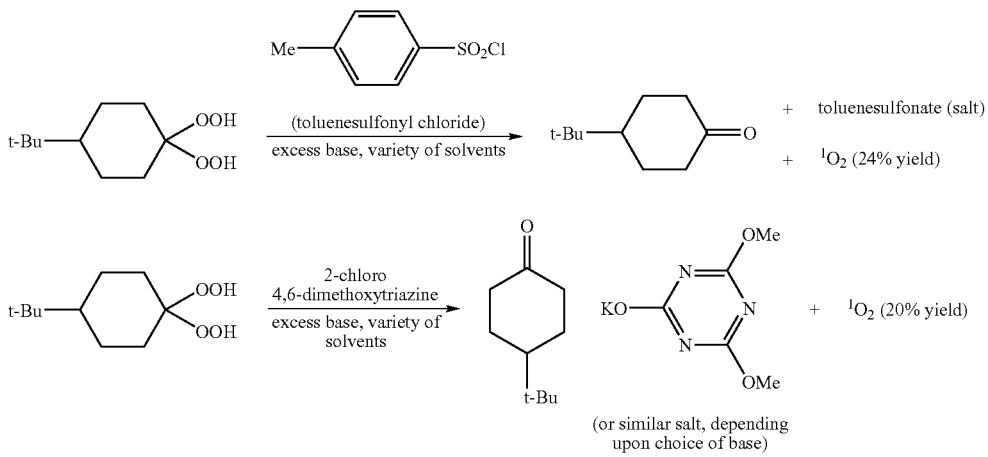

Without being bound by theory, it is believed that the mechanism of reaction for base-promoted generation of singlet oxygen from monoactivated derivatives of 1,1-dihydroperoxides (whether prepared separately or generated in situ) is as follows. It is believed that disclosed herein is the first example of a new class of reactions based upon the fragmentation of monoactivated derivatives of 1,1-dihydroperoxides (including monoactivated derivatives generated from in situ derivatization of 1,1-dihydroperoxides). It is believed that the mechanism for these new reactions is illustrated in Scheme 6, which involves the generation of an electron-rich peroxyanion and an activated peroxide, defined as a peroxide bonded to a group capable of delocalizing electrons from the distal peroxide oxygen, which are linked as a bisperoxyacetal by a central carbon. This array undergoes fragmentation to generate a carbonyl group, singlet oxygen, and a charged salt as a leaving group. In the case of the one-pot method, the monoactivated intermediate is not observed. However, its presence can be reasonably inferred based upon typical chemistry of hydroperoxides.

In support of this mechanism, no generation of singlet oxygen is observed from monoactivated derivatives of 1,1-dihydroperoxides in the absence of a base of sufficient strength to deprotonate the remaining hydroperoxide. Similarly, no generation of singlet oxygen is observed for deprotonation of 1,1-dihydroperoxides lacking an activating group; this includes monoalkyl or monotrialkylsilyl derivatives.

The mechanism is also supported by an observation that the ozonolysis of alkenes in the presence of amine-N-oxides results in the direct formation of ketone and aldehyde groups. This result was attributed to the formation of a transient acetal derivative comprised of a peroxyanion/oxyammonium acetal, which underwent a fragmentation topologically similar to that proposed in Scheme 6.

Based upon the proposed mechanism, singlet oxygen production could be reasonably expected from any precursor that would generate the proposed reactive intermediate (a peroxyanion bonded to the same carbon as a peroxide activated by an electron-withdrawing group). Thus, a derivative of a 1,1-dihydroperoxide in which one of the peroxides was activated by an electron-withdrawing group and the other by a silyl ether would be expected to undergo fluoride-mediated desilylation to generate the required intermediate and generate singlet oxygen.

Scheme 6. Proposed Mechanism and Likely Extensions.

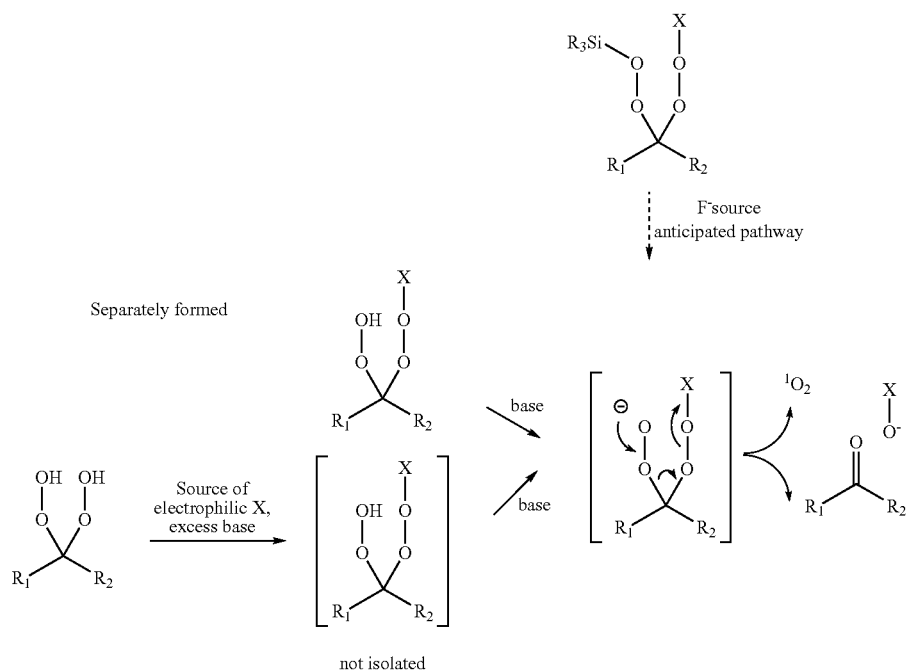

It is expected based on experimental observations (such as the examples in Scheme 5.1 above) and the presumed mechanism of reaction, that the stepwise formation and decomposition of monoactivated derivative should be successful for any monoperester, any monopercarbonate, and any monopercarbamate derivative of dihydroperoxide. It is also expected that the stepwise process may be applicable to more reactive monoactivated groups (such as for example phosphates, sulfonates, arenas, imidates) if special conditions (for example low temperature, brief handling) are employed to allow isolation of the monoactivated intermediates.

It is expected based on experimental observations (such as the examples of Scheme 5.2 above) and the presumed mechanism of reaction, that the one-step activation and decomposition of the 1,1-dihydroperoxides should be successful for any of the following reagents: any electrophilic acyl source (for example, acyl chloride, acyl bromide, acyl anhydride, acyl imidate, acyl alkyl or aryl ester), any electrophilic source of a carboxyl group (for example, dialkyl carbonate, diaryl carbonate, alkyl or aryl carbonyl chloride or anhydride, phosgene or equivalent), any electrophilic carbamyl source (for example, any carbamyl chloride or carbamyl anhydride), any electrophilic source of an alkyl or aryl sulfonyl group (for example, an alkylsulfonyl chloride or anhydride, arylsulfonyl chloride, bromide, or anhydride), any electrophilic sulfoxyl source for example, sulfuryl chloride, sulfur trioxide, a monohalosulfate); any electrophilic source of an electron-poor aryl or heteroaryl group (for example, chlorodinitrobenzene, 2-chloro-4,6-dimethoxy-1,3,5-triazene, cyanuric chloride); any electrophilic source of a phosphoryl group (for example, dialky or diaryl phosphoryl fluorides, cyanides, chlorides, bromides, or anhydrides; phosphoric anhydride; any electrophilic source of a nitrosyl or nitro group (for example, alkyl nitrites, nitrosyl chloride, nitrosonium tetrafluoroborate); any electrophilic source of an alkenyl or imidyl group (for example, trichloroacetonitrile or haloiminium (Vilsmaier) reagents.

Regarding solvents and conditions for base-mediated decomposition of 1,1-dihydroperoxides, the process should be successful in any solvent that allows the deprotonation of the 1,1-dihydroperoxide (for the one-step/one-pot method) and/or the deprotonation of the monoactivated derivative of the 1,1-dihydroperoxide (for either the one-step or two-step methods). In some embodiments, the solvent can be one of acetonitrile, tetrahydrofuran, water, and mixtures of acetonitrile and several different halogenated solvents, and the conditions include running the reaction at temperatures as low as about −78 Celsius (for example for tetrahydrofuran) or as high as about 50 degree Celsius, or alternatively at temperatures as low as from about 0 degree Celsius to about 30 degrees.

Bases which can be used for the base-mediated decomposition of 1,1-dihydroperoxides include cesium hydroxide, cesium carbonate, potassium tert-butoxide, tetra-n-butyl ammonium fluoride, cesium fluoride (in presence of the phase transfer agent tetramethylammonium acetate), and tetraalkyl ammonium hydroxides. No reaction was observed in the presence of weaker bases such as potassium bicarbonate. For either the base-promoted decomposition of an isolated monoactivated derivative of a 1,1-dihydroperoxide, or for the in situ formation and decomposition of the monoactivated derivative, generation of singlet oxygen is possible for any base which is at least partially soluble under the reaction conditions and which is of sufficient strength to deprotonate the monoactivated 1,1-dihydroperoxide, whether used as a precursor or generated in situ, to a significant extent under the reaction conditions.

2. Examples of Base-Mediated Decomposition of Monoactivated 1,1 Dihydroperoxides A. Decomposition of Monoperester of 1,1 Dihydroperoxides (Here Monoperester)

To a solution of CsF (cesium fluoride, 0.332 g, 2.2 mmol), Me4NOAc (tetramethyl ammonium acetate, 0.266 g, 2.0 mmol) and the terpinene (0.044 g, 0.25 mmol; a singlet oxygen trap) in CH3CN (4 mL), was added, over a period of 3 min, a solution of the monoperacetate of 4-tert-butylcyclohexane-1,1-dihydroperoxide in CH3CN (2 mL). Stirring was continued for 30 min, after which the solution was filtered through a plug of silica, which was washed with CH2Cl2. The residue obtained upon concentration was purified by column chromatography on silica gel to give 0.039 g (38%, based upon consumed monoester) of the endoperoxide ascaridole (oxidized terpinene, yield relative to consumed monoester).

B. Additional Examples of Base-Promoted Decomposition of Monoactivated 1,1-dihydroperoxides.

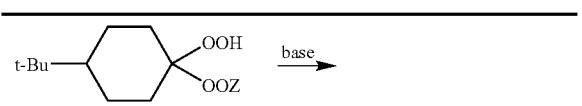

| Z | base | solvent | Time (h) | T (° C.) | Singlet oxygen (trapped, %) |
|---|---|---|---|---|---|
| Acetyl (monoperester) | KOtBu | THF | 1 | 0 | 15% |
| acetyl | KOtBu | THF | 2 | −78 | 21% |
| acetyl | KOtBu | CH$_3$CN | 0.5 | 0 | 30% |
| acetyl | KOtBu | CH$_3$CN | 1 | 0 | 50% |
| acetyl | KOtBu | CH$_3$CN | 1 | 0 | 75% |
| acetyl | Cs$_2$CO$_3$ | CH$_3$CN | 1 | 0 | 27% |
| acetyl | nBu$_4$NF | CH$_3$CN | 0.2 | 0 | 39% |
| Ethoxycarbonyl (percarbonate) | KOtBu | CH$_3$CN | 1 | 0 | 39% |

THF = tetrahydrofuran;
CH$_3$CN = acetonitrile;
KOtBu = potassium tert-butoxide.

C. In Situ Formation and Decomposition of Highly Activated Monoactivated Derivatives of 1,1-Dihydroperoxide (Here p-Toluenesulfonyl Chloride)

To a solution of the 1,1-dihydroperoxide of 4-t-butylcyclohexanone in tetrahydrofuran was added terpinene (a chemical trap for singlet oxygen) and potassium tert-butoxide (2 equiv). A solution of p-toluenesulfonyl chloride in tetrahydrofuran was added via a dropping funnel. Vigorous bubbling ensued, and ended not long after the addition ceased. Stirring was continued for 30 min, after which the solution was filtered through a plug of silica, which was washed with CH$_2$Cl$_2$. The residue, which contained both 4-tert-butylcyclohexanone and ascaridole (the reaction product of singlet oxygen and terpinene) was purified by column chromatography on silica gel to give pure ascardole (38-39% based upon the stoichometry of the dihydroperoxide).

D. Quantification of Liberated Singlet Oxygen

Trapping Reagents:

Singlet oxygen is a short-lived species. The yield of singlet oxygen generation is calculated by performing decomposition of the dihydroperoxide derivatives in the presence of proven trapping agents (Scheme 7) which had been previously benchmarked in literature studies.

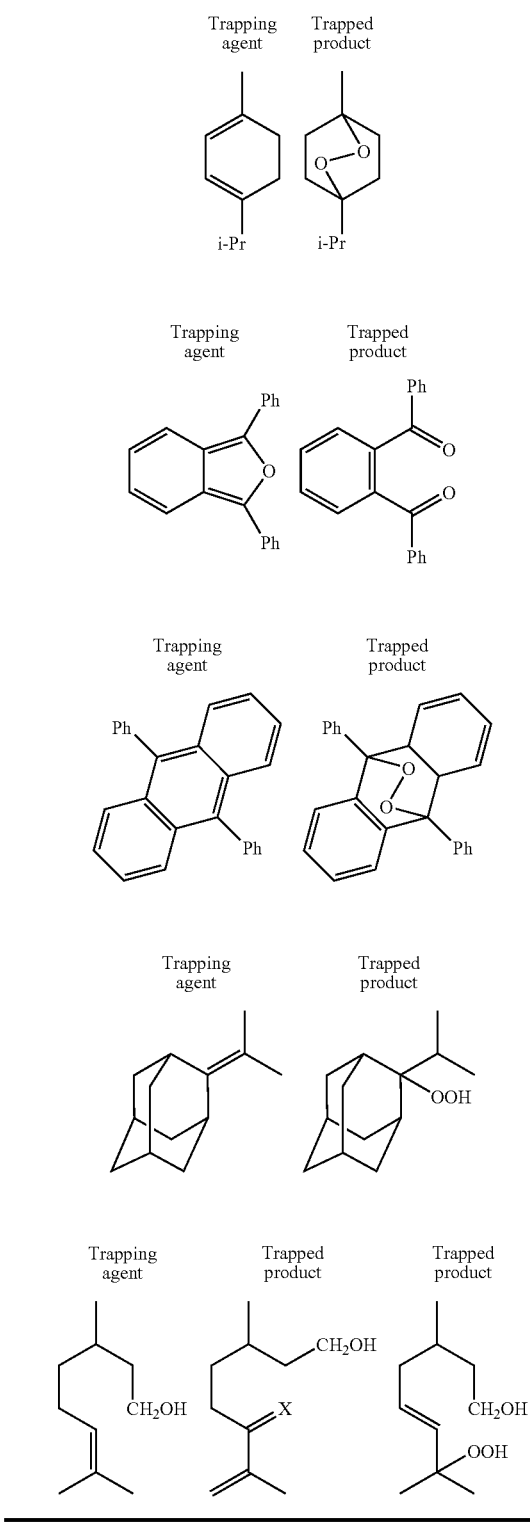

Quantification of Singlet Oxygen Produced by Decomposition of Perester

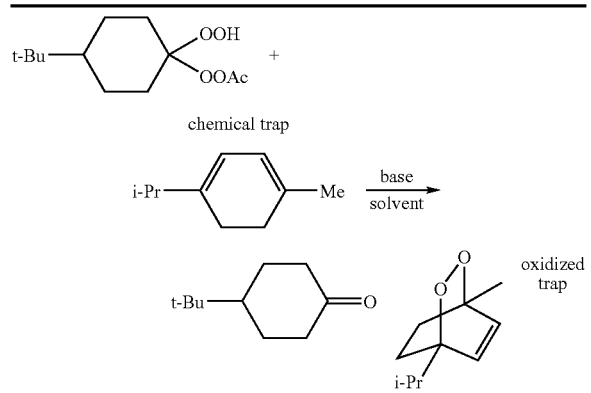

| chemical trap (stoichometry) | base | solvent | temp (° C.) | time (h) | percent of trap oxidized | net 1O2 generation |
|---|---|---|---|---|---|---|
| (0.5) | KOt-Bu | THF | 0 | 1 | 30% | 15% |
| (0.5) | KOt-Bu | THF | −78 | 2 | 42% | 21% |
| (0.5) | KOt-Bu | CH$_3$CN | 0 | 1 | 60% | 30% |
| (0.5) | KOt-Bu[b] | CH$_3$CN | 0 | 0.5 | 60% | 30% |
| (0.5, DBPF | KOt-Bu | CH$_3$CN | 0 | 1 | 100 | 50% |
| (1.0) | KOt-Bu | CH$_3$CN | 0 | 1 | 31% | 15% |
| (0.5 | K2CO3 | CH$_3$CN | 0 | 2 | NR | NR |
| (0.5 | Cs2CO3 | CH$_3$CN | 0 | 2 | 53% | 26% |

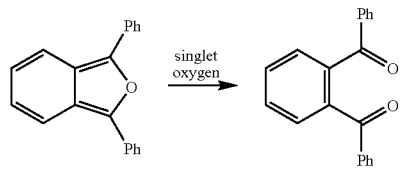

DBPF: a "hotter" trap.

Quantification of Singlet Oxygen Produced by Decomposition of Percarbonate

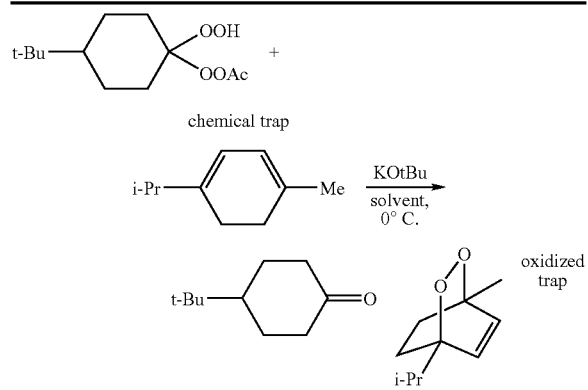

| chemical trap (stoichometry) | base (stoich) | solvent | time (h) | percent of trap oxidized | net 1O2 generation |
|---|---|---|---|---|---|
| (0.5) | 0.5 | CH$_3$CN | 1 | 78% | 39% |
| (0.5) | 0.2 | THF | 1 | 18% | 9% |
| (0.5) | 0.2 | THF | 2.5 | 38% | 19% |
| (0.5) | 0.2 | THF | 16 | 62% | 31% |

Catalytic amounts of base

Quantification of Singlet Oxygen Produced by Decomposition of Peroxysulfonate

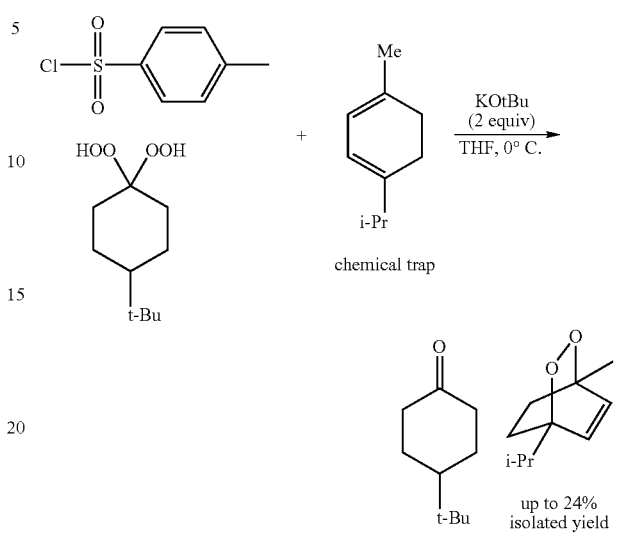

up to 24% isolated yield

E. Preparation of 1,1-Dihydroperoxide (Precursors)

The decomposition of monoesters, monosulfonates, monophosphates, monocarbonates, or monoaryl derivatives of 1,1-dihydroperoxides are based upon the use of 1,1-dihydroperoxide precursors. A handful of 1,1-dihydroperoxides are sold as commercial mixtures under names such as "methyl ethyl ketone hydroperoxide." 1,1-Dihydroperoxides can also be prepared from the corresponding ketones, aldehydes, enol ethers, or acetals by reaction with hydrogen peroxide in the presence of a catalyst by methods known in the art.

F. Preparation of Monoactivated Derivatives of Dihydroperoxide, Illustrated for 1-Acetyldioxy-1-hydroperoxy-4-tert-butylcyclohexane, a Dihydroperoxide Monoperester.

To a solution of 4-tert-butylcyclohexyl-1,1-dihydroperoxide (14.8 g, 72 mmol) in CH2Cl2 (150 mL), was added dimethylaminopyridine (0.9 g, 7.5 mmol), and pyridine (5.7 g, 72 mmol). The reaction mixture was cooled to 0° C. and a solution of acetic anhydride (7.4 g, 72 mmol) in CH2Cl2 (50 mL) was added dropwise over 10 min. Upon completion of addition, the reaction was stirred for 30 min at 0° C., and then diluted with CH2Cl2 (100 mL). The solution was washed with saturated NaHCO3 (20 mL), water (20 mL), brine (20 mL), and then dried over anhydrous Na2SO4. The residue obtained upon removal of the solvent in vacuo was purified by silica flash chromatography to give a white solid (14.7 g, 83% yield).

3. Decomposition of 1,1-Dihydroperoxides in the Presence of Stoichiometric or Catalytic Additives In some embodiments, methods of producing singlet oxygen involves decomposing, in the presence of stoichiometric or catalytic additives, 1,1-dihydroperoxides of formula (2):

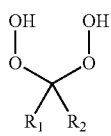

(2)

wherein R1 and R2 are as described above for base-mediated decomposition of monoactivated derivatives of 1,1-dihydroperoxides, except that R1 and R2 can also be H.

The decomposition of 1,1 di-hydroperoxides in the presence of additives is illustrated in Scheme 7.

Scheme 7. Additive-mediated decomposition of 1,1-dihydroperoxides

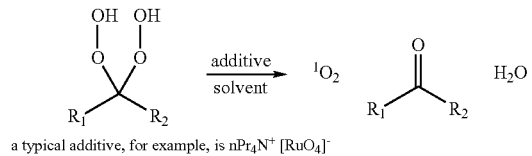

a typical additive, for example, is nPr$_4$N$^+$ [RuO$_4$]$^-$

Additive-mediated decomposition of 1,1-dihydroperoxides is specific for 1,1-dihydroperoxides; no decomposition is observed for monoalkyl, monotrialkylsilyl, or monoperester derivatives of 1,1-dihydroperoxides, or for dialkyl or bis(trialkylsilyl) derivatives of 1,1-dihydroperoxides.

Additives suitable for additive-mediated decomposition of 1,1-dihydroperoxides include iododbenzene diacetate (IDBA), Dess-Martin pyridinium dichromate, tetra-n-propyl ammonium perruthenate, titanium tetraisopropoxide, titanium oxo bis(acetylacetonate), Vanadyl oxide triisopropoxide, Vanadyl acetonylacetonate, Molybdenum dioxide, bis(acetylacetonate), Tungsten (VI) ethoxide, Phenylboronic acid, Propyl magnesium chloride, Diethyl zinc, Magnesium bromide, Magnesium tert-butoxide.

Based upon these results it is expected that the reaction would be promoted by any of the following, subject to limitations imposed by the need for at least partial solubility in the reaction medium: any iodine (III) or iodine (V) reagent; any soluble chromium (VI) reagent, any neutral or basic Ti (IV) reagent; any neutral or basic vanadium (V) reagent, any magnesium salt soluble in the desired medium, any organoboronic acid, any organozinc or organomagnesium reagent, any neutral or basic molybdenum (VI) regent, any soluble magnesium (II) or zinc (II) reagent. Selected samples of these reactions are shown in Table 2.

TABLE 2

Catalyzed decomposition of 1,1-dihydroperoxides

| Additive | solvent | yield of $^1$O$_2$ |
|---|---|---|
| Dess-Martin periodinane | CCl$_4$ | 24% |
| PhI(OAc)$_2$ | CCl$_4$ | 31% |

TABLE 2-continued

Catalyzed decomposition of 1,1-dihydroperoxides

| Additive | solvent | yield of $^1$O$_2$ |
|---|---|---|
| Mg(OtBu)$_2$ | CH$_3$CN/CCl$_4$ | 26% |

Regarding catalytic decomposition of 1,1-dihydroperoxides, a smaller group of additives have been found to catalyze the decomposition of 1,1-dihydroperoxides These additives include chromium (VI) species (for example, pyridinium dichromate, PDC) and ruthenium (VII) species (for example, tetrapropyl ammonium perruthenate, TPAP), both of which catalyze the decomposition of 1,1-dihydroperoxides with catalyst loadings of as little as 3% relative to substrate. With the exception of the amount of additive employed, the reaction protocol is identical to that described above for a stoichiometric additive.

Regarding solvents suitable for additive-mediated decomposition of 1,1-dihydroperoxides, the generation of singlet oxygen from the decomposition of 1,1-dihydroperoxides is expected to be successful in any solvent capable of at least partial solvation of both the 1,1-dihydroperoxides and the additives. Thus, reactions of basic magnesium salts have been conducted in tetrahydrofuran and acetonitrile, while reactions with an iodine (V) periodinane reagent have been conducted in acetonitrile, carbon tetrachloride, or dichloromethane. Moreover, reactions can be conducted in multiphasic media in which only the additive or the dihydroperoxide are significantly soluble in only one component. For example, decomposition of the 4-t-butylcyclohexane-1,1-dihydroperoxide by tetrapropylammonium perruthenate in a mixture of perfluorohexane and acetonitrile generates singlet oxygen, as evidenced by the oxidation of a chemical trap.

Without being bound by theory, it is believed the mechanism of the additive-mediated decomposition is as follows. The ability to achieve decomposition with catalytic amounts of chromium (VI) or ruthenium (VII) suggests that the additive is not consumed in the course of the reaction. This, along with the absolute requirement for a 1,1-dihydroperoxide and not any monosubstituted derivative, implies the interaction of the additive with both hydroperoxide groups, suggesting the intermediacy of a cyclic metallotetraoxane (Scheme 8).

Scheme 8. Possible mechanism for decomposition of 1,1-dihydroperoxides by additives.

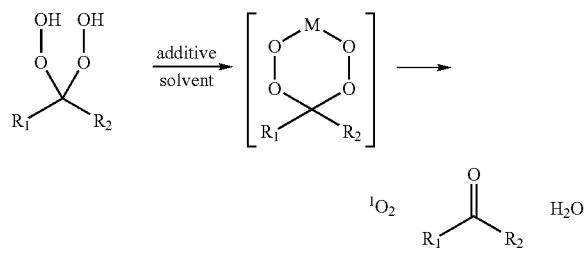

a typical additive, for example, is $nPr_4N^+ [RuO_4]^-$

4. Examples for Additive-Mediated Decomposition of 1,1-Dihydroperoxides

A. Exemplary Procedure.

To a 4-t-butylcyclohexane-1,1-dihydroperoxide and terpinene (trapping reagent) in a stirred room temperature solution of carbon tetrachloride was added, over a period of five to ten minutes, a solution of bisacetoxyiodobenzene (BAIB) in carbon tetrachloride. Rapid bubbling commenced upon addition of the BAIB solution and ceased within a few minutes after addition was completed. Stirring was continued for 0.5 h, after which the solution was filtered through a plug of silica, which was washed with CH2Cl2. The residue obtained upon concentration was purified by column chromatography on silica gel to give 4-t-butyl cyclohexanone and the trapping product ascaridole (endoperoxide of terpinene).

B. Additional Examples

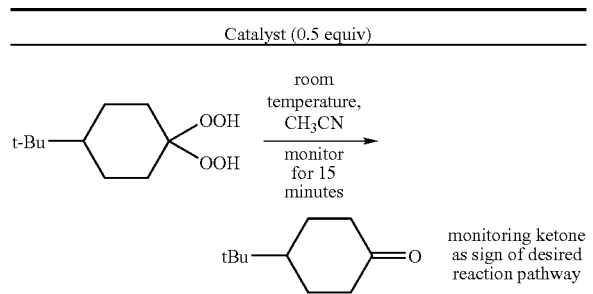

| catalyst | reaction rate | outcome |
|---|---|---|
| PhI(OAc)$_2$ (I$^{+3}$) | slow | only ketone |
| Dess-Martin periodinane (I$^{+5}$) | medium | ketone plus dihydroperoxide |
| PDC (Cr$^{+6}$) | fast (done in 15 min) | only ketone |
| TPAP (Ru$^{+7}$) | fast (done in < 15 min) | only ketone |
| V(=O)(OiPr)$_3$ (V$^{+5}$) | medium | ketone plus a byproduct |
| V(=O)(acac)$_2$ (V$^{+4}$) | medium | ketone plus dihydroperoxide |
| Re$_2$O$_7$ (Re$^{+7}$) | fast | only byproduct |
| SmI$_2$ (Sm$^{+2}$) | medium | ketone plus dihydroperoxide |

C. Additional Examples

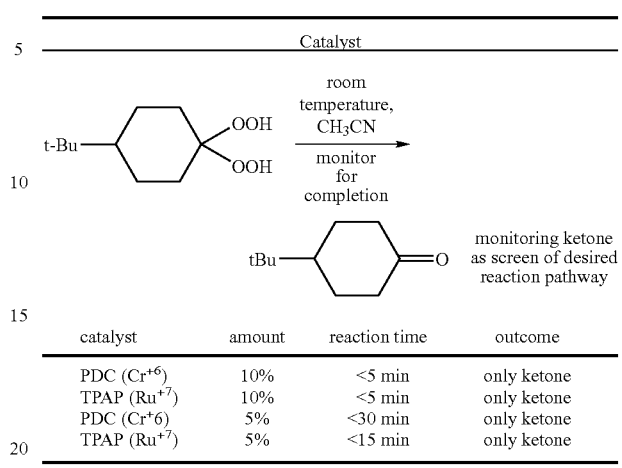

| catalyst | amount | reaction time | outcome |
|---|---|---|---|
| PDC (Cr$^{+6}$) | 10% | <5 min | only ketone |
| TPAP (Ru$^{+7}$) | 10% | <5 min | only ketone |
| PDC (Cr$^{+6}$) | 5% | <30 min | only ketone |
| TPAP (Ru$^{+7}$) | 5% | <15 min | only ketone |

Chemical trapping of singlet oxygen also achieved in presence of 5% TPAP (not shown)

A number of embodiments have been described. Nevertheless, it will be understood that various modifications may be made without departing from the spirit and scope of the disclosure. Accordingly, other embodiments are within the scope of the following claims.

What is claimed is:

1. A method of producing singlet oxygen, comprising:
   (a) decomposing, in the presence of a base, a mono-activated dihydroperoxide derivative of formula (1):

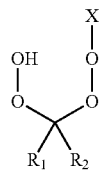

wherein: R1 and R2 are independently chosen from: methyl, primary alkyl, secondary alkyl, alkoxyalkyl, haloalkyl, and oxoalkyl, or R1 and R2 together form an aryl, cycloalkyl, or arylalkyl, and X is chosen from: acyl, carbonyl, carboxyl, sulfonyl, sulfoxyl, phosphoryl, carbamyl, aryl, vinyl, and imidyl; and
   (b) producing singlet oxygen;
   wherein the base is of sufficient strength to deprotonate the hydroperoxide of the mono-activated dihydroperoxide derivative of formula (1).

2. A method according to claim 1, further comprising producing the compound of formula (1) from a corresponding 1,1-dihydroperoxide.

3. A method according to claim 2, wherein the mono-activated dihydroperoxide derivative of formula (1) is unstable and producing and decomposing the mono-activated dihydroperoxide derivative of formula (1) is conducted simultaneously.

4. A method according to claim 3, wherein the mono-activated dihydroperoxide derivative of formula (1) is in the form of a monopersulfonate.

5. A method according to claim 1, wherein the mono-activated dihydroperoxide derivative of formula (1) is in the form of a monoperester or monopercarbonate.

6. A method according to claim 1, wherein the base is chosen from: cesium hydroxide, cesium carbonate, potassium tert butoxide, tetra-n-butyl ammonium fluoride, cesium fluoride, and tetraalkyl ammonium hydroxide.

7. A method according to claim 6, wherein the base is cesium fluoride, and the decomposing occurs also in the presence of a phase transfer agent.

8. A method according to claim 7, wherein the phase transfer agent is tetramethylammonium acetate.

9. A method according to claim 6, wherein the decomposition occurs in a solvent chosen from acetonitrile, tetrahydrofuran, water, and combinations of acetonitrile and one or more halogenated solvents.

10. A method according to claim 1, wherein the monoactivated dihydroperoxide derivative of formula (1) is one of:

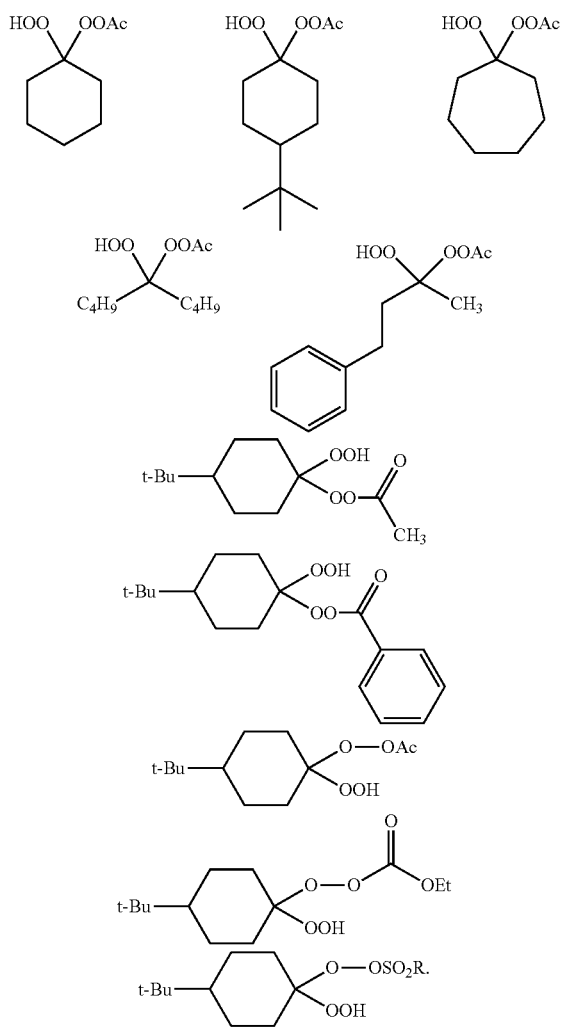

11. A method of producing singlet oxygen, comprising:
(a) decomposing, in the presence of at least one additive, a 1,1-dihydroperoxide of formula (2):

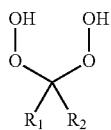

wherein R1 and R2 are independently chosen from hydrogen, methyl, primary alkyl, secondary alkyl, haloalkyl, alkoxyalkyl, and oxoalkyl, or R1 and R2 together form an aryl, cycloalkyl, or arylalkyl, further wherein only one of R1 or R2 can be hydrogen; and,
(b) producing singlet oxygen;
wherein the at least one additive is chosen from: iodobenzene diacetate, Dess-Martin periodinane, pyridinium dichromate, tetra-n-propyl ammonium perruthenate, titanium tetraisopropoxide, titanium xos bis(acetylacetonate), vanadyl oxide triisopropoxide, vanadyl acetonylacetonate, molybdenum, bis(acetylacetonate), tungsten (VI) ethoxide, phenylboronic acid, propyl magnesium chloride, diethyl zinc, magnesium bromide, and magnesium tert-butoxide.

12. A method according to claim 11, wherein the at least one additive is chosen from: pyridinium dichromate and tetrapropyl ammonium perruthenate.

13. A method according to claim 11, wherein the 1,1-dihydroperoxide of formula (2) is

14. A method according to claim 11, wherein the decomposing is performed in a solvent capable of at least partial solvation of both the 1,1-dihydroperoxide of formula (2) and the at least one additive.

15. A method according to claim 14, wherein the at least one additive is a magnesium salt and the solvent is chosen from tetrahydrofuran and acetonitrile.

16. A method according to claim 11, wherein the decomposing is performed in multiphasic media and only the at least one additive or the 1,1-dihydroperoxide of formula (2) is significantly soluble in the multiphasic media.

17. A method according to claim 16, wherein the 1,1-dihydroperoxide of formula (2) is 4-t-butylcyclohexane-1,1-dihydroperoxide and the multiphasic media is a mixture of perfluorohexane and acetonitrile.

18. A method according to claim 14, wherein the at least one additive is a iodine (V) periodinane reagent and the solvent is chosen from acetonitrile, carbon tetrachloride and dichloromethane.

* * * * *